United States Patent
Wells

(10) Patent No.: US 6,741,290 B1
(45) Date of Patent: May 25, 2004

(54) PROCESSING CODED VIDEO

(75) Inventor: Nicholas Dominic Wells, East Sussex (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/485,342

(22) PCT Filed: Aug. 10, 1998

(86) PCT No.: PCT/GB98/02397
§ 371 (c)(1),
(2), (4) Date: Apr. 4, 2000

(87) PCT Pub. No.: WO99/08441
PCT Pub. Date: Feb. 18, 1999

(30) Foreign Application Priority Data

Aug. 8, 1997 (GB) .............................................. 9716896

(51) Int. Cl.[7] .......................... H04N 9/475; H04N 7/12
(52) U.S. Cl. ................. 348/512; 348/425.3; 348/425.4; 348/722
(58) Field of Search ................................ 348/512, 513, 348/515, 425.1, 425.2, 425.3, 425.4, 705, 706, 553, 554, 555, 556, 558, 518, 500, 510, 722; H04N 9/475, 7/12, 11/20

(56) References Cited

U.S. PATENT DOCUMENTS

| | | | |
|---|---|---|---|
| 5,602,592 A | | 2/1997 | Toshiaki et al. |
| 5,652,627 A | * | 7/1997 | Allen .......................... 348/497 |
| 5,801,781 A | * | 9/1998 | Hiroshima et al. ......... 348/441 |
| 6,061,399 A | * | 5/2000 | Lyons et al. ................. 375/240 |

FOREIGN PATENT DOCUMENTS

| | | |
|---|---|---|
| EP | 0 395 408 | 10/1990 |
| EP | 0 590 974 | 4/1994 |
| EP | 0 711 073 | 5/1996 |
| EP | 0 817 502 | 1/1998 |
| WO | 96/17490 | 6/1996 |

* cited by examiner

Primary Examiner—Michael H. Lee
(74) Attorney, Agent, or Firm—McDermott, Will & Emery

(57) ABSTRACT

A method of processing coded video, for example by inserting generated frames, or adjusting values in timing fields, or adjusting the time at which it is output, to adjust the timing of output of decoded video from a decoder receiving the coded video is disclosed, together with corresponding apparatus. The outputting apparatus may be included in a multiple-source video system, to enable multiple video sources to be synchronized. The output video can be synchronized to a studio reference clock.

18 Claims, 6 Drawing Sheets

PROCESSING CODED VIDEO

The present invention relate to processing of coded video signals, particularly but not exclusively MPEG format compressed video. The invention is particularly, but not exclusively, concerned with real-time editing of video signals.

A problem with transmitting or storing video signals as a compressed or coded video data stream is that it is not normally possible for a decoder to commence decoding a new data stream instantaneously, but there is normally a delay of several frames while the decoder establishes synchronisation. For example with an MPEG data stream, a video sequence is sent as a series of groups of pictures ("GOP"), each GOP comprising an intra-coded frame ("I frame") and one or more frames predicted from the I frame, either by forward prediction ("P frames") or by bi-directional prediction ("B frames"). A decoder cannot commence decoding of the sequence until it receives an I frame. In addition, frames are buffered and processed within a decoder, so there can be an appreciable and unpredictable delay between supply of a video data stream to a decoder and output of the sequence of video frames.

For practical purposes, this presents a problem only when the decoder first receives a new signal; once synchronised, the decoder should continue to produce an output reliably. However, difficulties are encountered when it is desired to switch from one coded video source to another. In particular, a decoder buffer can overflow or underflow if the data stream input to the decoder is simply switched from one source to another.

The problems associated with switching between coded video sources have been recognised, and techniques have been proposed for switching between compressed bitstreams with minimal output degradation at the point of switching. An example of such a technique is described in our International Application No. WO 97/08898.

Prior art techniques have generally concentrated on dealing with problems occurring at or about the point of switching, and generally aim to provide a "good compromise" solution.

In general terms, the inventor has proposed that coded video source material is modified, if necessary, to adjust timing of output of frames from a downstream decoder, and preferably to establish and maintain a desired synchronisation of a downstream decoder. This can be achieved by setting the timing of the video source material (for example by explicitly adjusting values of timing fields contained in the data stream, or by altering the time at which the data is actually output to the decoder, or both) based on a studio reference clock. This can also (additionally or alternatively) be achieved by inserting "synthetic" frames (frames which have been generated and added to the original video source material) within the output data stream, so that a particular frame is displayed at a particular time. It is noted that if decoder synchronization is maintained in this way, the timing of display of particular frames need not be explicitly specified.

Looked at from another point of view, with the invention, the timing information contained in video source material (this is normally included to enable reliable playback of that material as intended) may be deliberately altered or additional frames may be added. Conventionally, it is not generally considered desirable to tamper with the internal, self-consistent, timing information contained in coded video data. However, this novel basic technique may provide numerous advantages, as will become clear as the description proceeds. Surprisingly, although the invention is in its most general terms not directed specifically at the switching of bitstreams, one advantage is that switching from one video source to another can be facilitated if both sources are synchronised. Another advantage is that playout of coded video material may be more readily controlled, for example for starting or pausing at a particular time.

According to a first, aspect, the invention provides apparatus for outputting a coded video sequence comprising:
    means for receiving a coded video sequence to be output;
    means for outputting the coded video sequence in a form enabling real-time decoding of the sequence to produce a sequence of pictures;
    means for processing the coded video sequence and/or adjusting the timing of said outputting to produce decoded picture output from a decoder receiving the output sequence at a selected timing.

In this way, contrary to conventional compressed video sources, the timing information contained within the original sequence, or the actual time of output can be controlled deliberately based on external criteria, rather than in dependence on the timing data contained with the video sequence. This facilitates synchronisation of multiple video sources.

The video input sequence will typically be received from storage such as a disk, for example as a computer data file, and may be sent over a computer network. However, the sequence may be received in real-time, for example off-air, and may be contained in a multiple transport stream containing several sequences and other data. Where the data is received in real-time, the input data will usually need to be buffered, to enable differences in timing between input and output, and, of course, output cannot occur before the data has been received. As will be appreciated, as the size of the buffer increases, the distinction between receipt of "real-time" data and access of stored sequences diminishes.

Preferably, the apparatus includes means for receiving a studio reference clock, the processing and/or the timing of the outputting being controlled in dependence on timing information derived from the studio reference clock. This feature may facilitate synchronisation with other apparatus within a studio.

The studio reference clock is preferably supplied as a relatively high frequency clock counter having a relatively large maximum value, preferably at least 50 kHz and at least about 32 binary bits, "wide" (by which is meant the information content; the clock value may be supplied in another format, such as Binary Coded Decimal, in which case about 9 or 10 nibbles or digits would be required). In a preferred practical implementation, the clock is in a format that is readily or directly convertable to the format of timing fields within the video sequence. For example, the studio clock may be supplied directly as MPEG PCR values.

The, apparatus may include means for determining an effective clock frequency for the output coded video sequence based on the rate of change of clock values (for example PCR fields within an MPEG video sequence) contained within the output data and means for comparing or synchronising the effective clock frequency to the studio reference clock frequency. This may enable errors in original timing information to be identified and corrected, to achieve playback at a precisely controlled rate.

The apparatus may also include means for inputting information specifying a desired picture output time of at least one frame or field of a video sequence, said processing and/or adjusting being selected based on the desired picture output time and the studio reference clock so that said at least one frame or field is output from a decoder at the desired picture output time. In this way, the apparatus is able to look ahead, and prepare a video sequence for output at a precisely defined time, which solves a common problem in playing back video sequences live. It has been appreciated that solutions to problems of run-up or lead-in commonly employed in analogue storage systems (recording a 5 second lead-in sequence prior to The first frame required and commencing playing of the sequence 5 seconds before the frame is required) cannot be reliably used with coded sequences, as there is a somewhat more unpredictable delay before a decoder establishes synchronisation.

One way in which picture output time can be set is by altering one or more values in timing fields contained within the video sequence (for example PCR (programme clock reference) or PTS (presentation time stamp) or DTS (decoding time stamp) or vbv_delay (video buffer variable delay) fields in a MPEG data stream). In place of specifying the output time directly, a measure of the output time may be specified, or a PTS or DTS value may be explicitly specified.

Since some decoders may not respond to the values explicitly set in all of the PCR, PTS or DTS fields, the apparatus may (additionally or alternatively) adjust the timing at which data output begins to ensure that decoding takes place and is completed at a desired time. This may be achieved by estimating the required delay between transmission of data and commencement of picture output and adjusting data output time based on this estimated delay, relative to the desired picture output time. The delay may include an offset time to take into account delays in a decoder, and also propagation delays in cables and the like in the video signal path, and a variable delay for the frame concerned, for example equal to or based on the vbv_delay value originally specified or calculated. The apparatus may include means for storing characteristic propagation delays for a plurality of different types of decoder, and may also include means for determining propagation delays for a known length of cable. The apparatus may be arranged to set a PTS value to a time in advance of a desired output time, based on a decoder propagation delay.

Preferably, the apparatus includes means for correlating a studio reference clock time in a first format with a desired output time in a second format. In this way, precise control of timing may be attained whilst facilitating control by a user or by other editing apparatus. Apparatus for converting between formats is independently provided in another aspect of the invention.

In a further aspect, the invention provides the above mentioned outputting apparatus included in a multiple source video system comprising a plurality of video sequence sources, at least one video sequence source comprising such outputting apparatus arranged to receive a respective coded video sequence and having a decoder coupled to the output thereof to produce a respective decoded video sequence output therefrom; means for supplying a studio reference clock to the or each outputting apparatus; means for receiving editing information specifying timing of changes between video sequence sources; means for supplying a selected video sequence source to a video output channel based on said editing information; and means for supplying desired picture output time information to the or each outputting apparatus based on said editing information.

In addition to or instead of means for inputting a studio reference clock, the apparatus may include means for generating a sequence of one or more frames to be inserted in the output sequence, the means for processing including means for inserting the generated sequence into the coded video sequence to adjust the timing of picture output of frames of the coded video sequence, the generated sequence being selected to maintain or establish synchronisation of a buffer of a decoder receiving the output sequence. With this feature, it may become possible to effect timing adjustments over longer periods of time, and to maintain decoder synchronisation while a sequence is paused. Other effects, such as slow-motion playback may also be possible, and cutting from one sequence to another may be facilitated. With this feature, the decoder output timing need not be explicitly selected; the maintenance of decoder synchronisation is, for the purposes of this specification, considered to be equivalent to implicit selection of decoder output timing.

The apparatus may be arranged to insert the generated sequence before a given frame of said coded video sequence, the size of the generated frames and/or the timing information associated with, or the time of transmission of, the generated and/or said given frame being selected so that, on commencement of decoding of said given frame following decoding of the generated sequence, the buffer occupancy of a decoder receiving said output video sequence will be substantially at a desired value. In this way, buffer underflow or overflow problems may be alleviated, and buffer synchronisation established and maintained.

The generated sequence may be inserted before said given frame and after at least one preceding frame in the coded video sequence, wherein the desired value of buffer occupancy is set to be substantially equal to the buffer occupancy expected if no generated sequence were inserted between the preceding frame and said given frame. This enables buffer synchronisation to be maintained during an interruption.

It will be appreciated that the invention can effectively provide apparatus capable of outputting a real-time bitstream (a "video pump") in which synchronisation of the bitstream can be controlled independently of the video data source. Thus, another advantage the invention may provide is that a source of video data, for example a series of computer readable files on a disk or a recorded MPEG transport stream, can be separated, for example over a computer network, from the apparatus for outputting a real-time bitstream. This is provided in a further aspect, in a system for supplying real-time coded video data comprising means for storing the coded video data; a data transmission link for supplying the stored coded video data in response to requests for data; apparatus according to the first aspect arranged to request and receive data across said data transmission link and to output synchronised real-time coded video data therefrom.

The invention extends to related methods of operation.

Embodiments of the invention will now be described, by way of example only, with reference to the drawings, in which.

Figure 1:
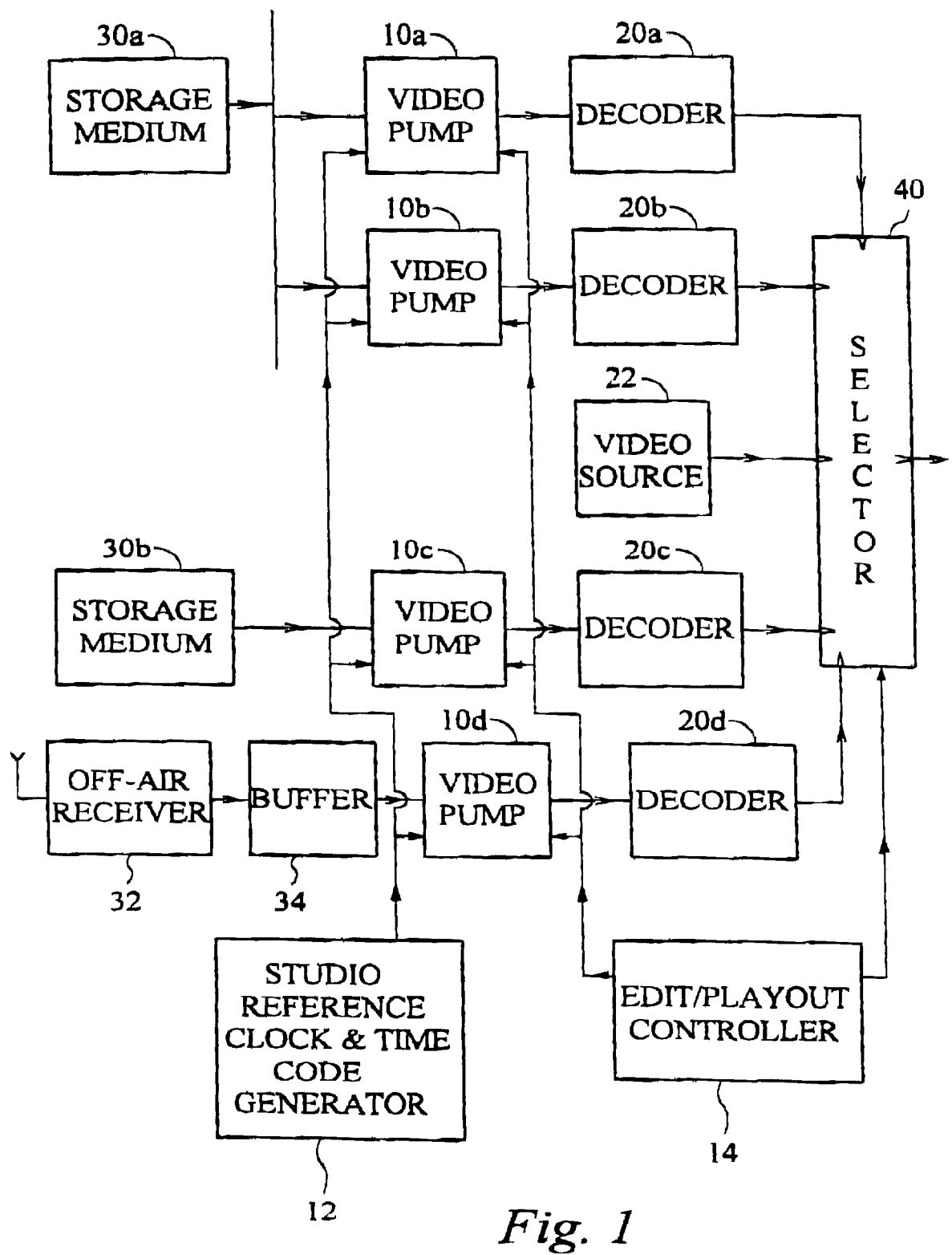
FIG. 1 is a block diagram of a multiple source studio system embodying The invention.

In the following discussion, specific reference is made to MPEG sequences; it is to be understood that the various features presented may be applied to other coded video sequences unless otherwise stated. As background we begin by reviewing some particular features of MPEG sequences; this is useful for explaining one particular problem which different preferred features of the embodiments alleviate, and for providing guidance to broader application of the specific features to other video sequences.

As mentioned above decoding of a new sequence can only commence when a new I frame is completely received; I frames provide entry points to a sequence. Coded frames are of variable length, with I frames normally being much larger than P and B frames. If the data is transmitted over a link whose capacity is sufficient to ensure that the average data rate is enough to supply frames at a desired frame rate, it is likely that an I frame will take several frame periods to transmit, during which time the decoder will have nothing to display. There is a significant but unpredictable delay before initial output of a decoded sequence following supply of a sequence to a decoder. Once synchronisation of the decoder is established, the decoder will continue to operate reliably regularly producing frames. An exception occurs if for some reason the buffer contains insufficient frames to keep the decoder supplied while a frame (for example a large I frame) is being written; the decoder will run out of frames to display and this condition is known as buffer underflow. Another problem is that signal processing within the decoder takes a finite time, which is generally substantially constant for a given decoder, but may vary from decoder to decoder.

It will be appreciated that the embodiment of the invention may be readily applied to other coded video sequences which have one or more analogous properties, for example, specific entry points at which decoding can commence, variable frame size, timing fields specifying when frames are output, or a need to establish or maintain decoder synchronisation.

The above summary has concentrated on the data content of a single video programme. In practice, the apparatus may receive computer data files or may receive an MPEG transport stream containing multiple programmes or a single programme, and other header information. Where a transport stream is received, other fields and information (for example PATs, PMTs etc.) may also be processed by the apparatus. Such processing is not, however, germane to the present invention, and for the purposes of the following discussion it will be assumed that the data has been pre-processed and buffered as necessary for correct decoding of an individual programme. Of course, a single apparatus may be capable of processing more than one video sequence in parallel.

It is noted that the problems mentioned above relating to initial decoder synchronisation can often be tolerated if it is simply required to view a single sequence; the problems become critical in a multiple source video system, for example in a broadcast studio, where frequent changes between video sequence sources are required. Video outputting apparatus embodying the invention will thus be described in the context of a multiple source system, but it is to be appreciated that the apparatus is not limited to such an application.

Multiple Source Video System

Referring to FIG. 1, a multiple source video system comprises a video pump 10a supplying coded real-time video to a decoder 20a, and receiving coded video data from a storage medium 30a. In this embodiment, the video pump 10a and a second video pump 10b supplying a second decoder 20b are both connected to the storage medium 30a (for example a computer file server) over a computer network. This embodiment also includes a third video pump 10c supplying a third decoder 20c and receiving data from a dedicated data source 30b, and a fourth video pump 10d receiving "live" coded video via an off-air receiver 32 which includes a demultiplexer for extracting a single programme stream from the received data and buffer 34 having a capacity sufficient to store several minutes (here about 30 minutes) of video data, the fourth video pump supplying a fourth decoder 20d. The outputs of all decoders are connected to a selector 40 which selects an output from one of the decoders; the output may be broadcast (either in analogue or digital form), or may be stored or re-coded. In this embodiment, the decoders produce an output in decoded digital form including information concerning coding decisions based on the original coded video (MOLE format), to enable re-coding with minimum loss of quality. However, other decoding, for example to full analogue may be employed. A further video source 22 producing an uncoded signal of similar format to the decoder output, for example from a studio television camera is also supplied as an input to the selector 40. For synchronisation purposes (explained further below), each video pump receives a timing signal from a studio reference clock 12. The studio reference clock typically supplies a 42 bit SSTC counter value based on a 27 MHz clock, comprising a 33 bit 90 kHz (equal to the clock frequency divided by 300) base value and a 9-bit (modulo 300) extension value clocked at 27 MHz. In this embodiment, the clock 12 also converts the 42 bit studio reference clock times into SMPTE time codes and supplies both along a common bus at regular intervals. Each video pump also receives playout decision information from an edit/playout controller 14. The edit/playout controller typically specifies edit/playout times in SMPTE codes. The SSTC and related SMPT time values can be supplied separately, but preferably the SSTC bus provides information enabling correlating the two. Of course, other variants are possible; for example, the studio clock values may be converted into SMPTE values, and it is not necessary to supply SMPTE values if the corresponding studio clock counter values are supplied by the playout controller.

Editing or playout decisions may be specified in advance, for example as a play schedule for a period of time (for example "At 9.00 pm and 15.0 seconds, play the video sequence entitled 'Film A' commencing at Frame 0 via video pump 10a"), or may be modified or set in real-time. For example, an immediate request to play a sequence may be translated into a request to commence playing in exactly 5 seconds time.

The editing or playout decision information is sent to both the selector 40 and the video pumps 10. Where a video pump only has access to a single coded video source, for example the video pump load receiving a single buffered off-air video sequence, the editing information need not specify the description of the source; otherwise, the description of the source may be sent to the video pump which may request the appropriate data from the storage medium, or may be sent directly to the storage medium.

The selector simply switches the output from one source to another at the specified time, and may be entirely conventional. The appropriate video pump determines when the coded video sequence must be played, and how to ensure synchronisation so that the decoder is producing the correct output at the time of the switch. This can be achieved in a number of ways, as will be described in more detail below.

Video Output Apparatus

Figure 2:
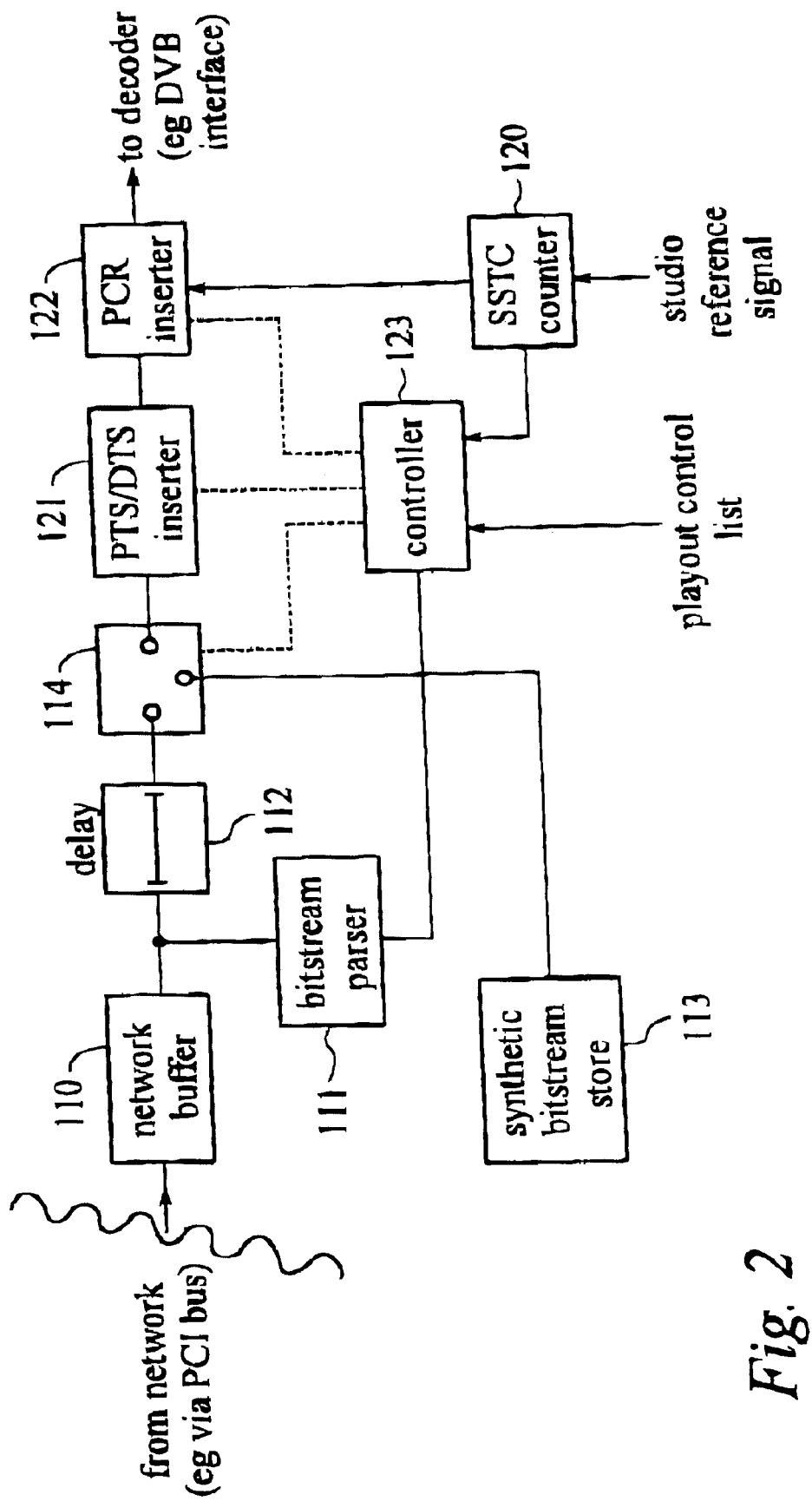
FIG. 2 is a block diagram of a video output apparatus employed in the studio system of FIG. 1.

Referring to FIG. 2, apparatus for outputting coded video from a coded video source (a "video pump") 10 will now be described. Programme or video data is received from a data input, for example a computer network, and is fed to a network buffer 110 which smooths discontinuities in the time of arrival of the data resulting from server and network latency. The precise method of feeding data to the network buffer is not critical, and forms of itself no part of the present invention; any suitable protocol used in similar computer networks may be used, provided of course that the buffer always contains enough data for the output to be maintained. Typically, the apparatus will be controlled by a computer, which will also control the feeding of data from a network server or disk. The data is fed to a bitstream parser 111, which detects appropriate fields in the video and system layers for re-stamping and for switching to synthetic streams. The data is also fed to a delay 112, which compensates for the delay in the bitstream parser 111. A synthetic bitstream store 113 contains versions of synthetic video bitstreams in an appropriate form. A switch 114 is fed with the data from the delay 112 and from the synthetic bitstream store 113, and selects between these sources, ie between the input and synthetic bitstreams.

A studio system time clock (SSTC) 120 provides a count which can be inserted in PCR fields such that the decoder will synchronize to studio time. The bitstream emerging from the switch 114 is fed to a unit 121, which re-stamps the fields mentioned above, including in particular the PTS/DTS fields. The bitstream then passes to a unit 122, which re-stamps the PCR fields. This is shown as a separate final block in the bitstream, because there must be a minimum of timing jitter between the insertion of the PCR fields and the reception of these fields by the decoder.

A controller 123 is fed with commands from a play-out control list and by the local SSTC counter 120. This controller controls the following functions:

the timing of the switch between synthetic and image bitstreams;

the re-stamping of PTS/DTS fields as well as the other fields listed previously; and the re-stamping of PCR fields.

The interface hardware 121 and 122 re-stamps PCR and PTS/DTS fields for both synthetic and image bitstreams. The values inserted in the PCR fields are such that the following decoder will have an internal decoder clock count which is synchronized to a similar count in the studio. This enables the presentation/display times of particular decoded frames to be synchronized to precise studio times.

The PTS/DTS values are re-stamped with appropriate values, as described more fully below, in relation to the decoder clock count (DCC) such that:

there is continuity of PTS/DTS values between synthetic and image bitstreams;

the decoder buffer does not overflow or underflow; and when the DCC is synchronized to the studio system time clock, then the PTS values correspond to the times at which it is desired to display particular frames of the image sequence (e.g. in accordance with a play-out list).

Continuity of PTS/DTS values may be set by adding an offset to the values in the original coded video sequence; for example, if the first PCR/PTS/DTS value is modified from a value x (stored in the coded video, based on the original coder counter value) to a value y (based on the studio reference clock), all subsequent values may be modified simply by adding an offset (which may be positive or negative) of (x-y) to the incoming values.

In addition to setting timing values, the data output rate, or timing of outputting of coded frame data, must be set so that the decoder buffer does not overflow or underflow.

It is noted that in simplified versions of the apparatus, some features may be omitted; for example, if it is merely desired to synchronise an output clock frequency to a studio reference clock, the means for generating synthetic frames may be omitted. Similarly, if precise timing of the decoder output is not required, the studio reference clock input may be omitted, the apparatus still being capable of generating bitstreams adapted for pre-synchronising of a decoder or pausing or slow-motion playback. Most flexibility is, however, assured if the above features are included together.

Timing Field Values

There are a number of ways in which synchronisation can be effected, and these will be explained following a discussion of the function of various timing fields within an MPEG sequence; other fields having related functions may be employed in other coded video sequences.

Each decoder has its own clock, typically running at 27 MHz, producing a Decoder Clock Count (DCC) value which increments at a similar rate to the PCR values in the original data. Owing to tolerances, there may be a gradual drift between a DCC and the original coder clock values, which might accumulate. By transmitting PCR values at intervals in a coded data stream, a coder in a transmitter can effect and maintain synchronisation of a decoder clock to its own clock, Thus, conventionally. DCC values are set in synchronisation with the original data stream, but have no external applicability. The coder may send with a frame a DTS value specifying the time at which the frame should be extracted from the decoder buffer for decoding and a PTS value specifying the time at which the decoded frame should be displayed For B frames, which are not stored in the receiver, the DTS and PTS are identical; for I and P frames, which are stored in the decoder, the DTS precedes the PTS.

In the above described apparatus, the PCR values in the original data stream are replaced by values based on the studio reference clock. In this way, the DTS and PTS fields may be used to specify an absolute time. Thus, in principle, display of a frame at a particular time may be effected simply by setting the PIS field to the appropriate time (in practice, this may differ in practice from the actual output time due to output delays in a practical decoder, so the apparatus may include means for storing an offset value to be added to or subtracted from values written into this field).

A complication is that the PTS and DTS fields are not obligatory for every frame, and, not all decoders may use them, particularly after synchronisation is first established.

Thus a further parameter, the vbv_delay field may be used; this specifies the delay before a frame, particularly an I frame, can be read from the decoder buffer. It will be realized that the vbv_delay can actually be determined from this more general timing; this time is the difference between the time when the frame is received and the time when the frame is removed from the buffer for decoding. Thus we have $$\text{vbv\_delay} = \text{DTS} - \text{DCC}(\text{frame write}) \quad \text{(Eqn 1)}$$

The decoder should use the DTS to determine the vbv_delay if the DTS is available; if there is no DTS available, then it should use the vbv_delay value from the frame header. Thus, the vbv_delay value may not be explicitly specified (in an MPEG sequence, a vbv_delay field containing 0xFF throughout signifies no specified value) in the video layer, in which case an effective vbv_delay may be calculated based on the DTS field in the PES layer and the actual time of writing of the frame. Throughout this specification, references to an effective vbv_delay value are intended to encompass any such parameters or combinations of parameters which determine the residency time of a frame within a decoder buffer.

With the above information, it will be seen that playout of a desired frame at a desired time can in principle be achieved without addition of synthetic frames, simply by setting the appropriate timing field values, and commencing output of the data corresponding to the first I frame of the desired sequence in advance of the desired picture output time by an amount equal to the vbv_delay for that frame plus any additional offset delay. A potential drawback of this method is that the decoder only has one chance to synchronise and then must stabilise immediately; if for some reason the data gets corrupted, the beginning of the sequence will be missed. Thus it is usually preferred to effect synchronisation by pre-pending an initialisation sequence of generated or synthetic frames to the original sequence, as discussed further below. Considerations affecting the choice of synthetic frames will now be discussed.

Content of Synthetic Frames

Generally speaking, it is preferred that at least some of the generated frames are preferably of relatively low information content (as compared to a typical picture frame), so that writing and reading the frames takes relatively little time. In particular, it is preferred if the average data content of each generated frame is at most equal to the amount of data that can be written in a single frame display period, and preferably substantially less (for example at most half).

More specifically, in an MPEG sequence, a black I frame, or an I frame containing a simple logo (by which is meant a picture the coding of which requires relatively little data compared to an average real picture scene, preferably an amount of data that can be transmitted in approximately a single frame period or less), or a P frame encoding no motion, may be used. If a static or simply moving logo is transmitted, the initial I frame may contain more data than can be sent in a single frame period, but the average data rate for a sequence containing the I frame and one or more P frames will be below the required rate. In this way, frames can be output at an average rate of one frame per frame period and there is flexibility to insert generated frames for prolonged periods without running into buffer underflow and overflow problems, and without recourse to complex buffer occupancy determining methods. Moreover, output of the generated sequence may make it possible to "buy time" in which to output data for a larger frame. In other words, following outputting of the generated sequence, it may be possible to commence outputting data for the next frame of the original coded video sequence (for example an I frame) containing a large amount of data in advance of the desired display time, while the decoder buffer contains data for several synthetic frames to be output, so that the decoder buffer always contains frames for display. Thus, by controlling the size of the synthetic frames (which will usually be small), and/or by adjusting the time at which the frames are output and/or by adjusting the time values specifying the residency time for the frames in the decoder buffer, a desired buffer occupancy can be achieved.

Specific examples of synthetic frames which may be inserted, for various purposes, will now be described.

Black I-frame

The relevant properties/parameters of a simple synthetic black I-frame may be summarized as follows:
Prediction mode Intra
Frame/Field DCT mode Frame mode (either could be used)
Coefficient values All zero including DC coefficient (or black I frame)
Picture size Value taken from associated image sequence
vbv-delay Value taken from first I frame of following sequence
elementary stream bit-rate Value taken as max. from associated image sequences
Temporal Reference Set to zero assuming I frame follows GOP header
Alternatively the I-frame could be coded as a black I/P field pair Synthetic P-frame The relevant parameters to be set for each synthetic P-frame would be as follows:
Prediction mode Frame prediction
Motion vector Zero, forward, frame vector
Frame/Field DCT mode Frame mode (either could be used)
Differential coefficient values All zero
Picture size Value taken from associated image sequence
vbv-delay Value taken from first I frame of following sequence*

* Not appropriate when pausing a decoder using synthetic P-frames—see below elementary stream bit-rate Value taken as max. from associated image sequences
Temporal Reference Increments mononically for successive coded frames For output, as is known, the video elementary stream is first packetised into PES packets. These can have many optional fields in the header of each PES packet. For the synthetic bitstream the PES packet header is preferably as simple as possible with as few optional fields as possible. Also, it would be convenient to contain each coded frame (access unit) within a single PES packet.

At the PES (Packetised Elementary Stream) layer the following fields in the PES packet headers need, in particular, to be set appropriately;
PTS/DTS fields
Stream ID field This is a relatively straightforward matter; the considerations affecting PTS and DTS values are discussed generally above, and in more detail in relation to specific synthetic bitstreams below, and the Stream ID field must be set to the same as that of the original video stream.

Having described suitable basic synthetic frames, some functions achievable using synthetic frames will now be described, together with more details of specific suitable sequences.

Initial Decoder Synchronisation

A suitable synthetic bitstream to effect initial decoder synchronisation consists of a black I-frame followed by a sequence of synthetic (null) P-frames. The initial frame need not be black, but may contain a simple logo. To ensure synchronisation, several such sequences (including several I frames) may be transmitted. Although such a sequence may only be transmitted a few frames or a few seconds before start of the desired sequence is required, it is equally possible to transmit such a sequence for prolonged periods of time, for example several hours, to keep a decoder synchronised over a prolonged period of time. In such cases, the decoder may also be "paused" in the synchronised state (as discussed further below). At an appropriate time (once the decoder has locked up) a switch is made to the first I-frame of an image sequence bitstream. For example:

| Bitstream: | $I_0$ | $P_1$ | $P_2$ | $P_3$ | $P_4$ | $P_5$ | $I_0$ | B | B | $P_1$ | B | B | $P_2$ | B | B | |
|---|---|---|---|---|---|---|---|---|---|---|---|---|---|---|---|---|
| Display: | | $I_0$ | $P_1$ | $P_2$ | $P_3$ | $P_4$ | $P_5$ | B | B | $I_0$ | B | B | $P_1$ | B | B | $P_2$ |

The synthetic frames are shown in italics. From this example it can be seen that for each synthetic I- and P-frame $$PTS = DTS + T \quad \text{(Eqn 2)}$$

where T is the video frame period. As mentioned earlier, B frames are not stored in the decoder and are decoded and output without delay, whereas I and P frames needed to decode B frames are normally output in advance of display time. Thus, in the above sequences, B frames have not been numbered, each B frame in the display sequence corresponds directly to the B frame vertically above in the bitstream sequence.

Suppose that it is required to display the first I-frame ($I_0$) of the image sequence at time $t_{disp}(I_0)$ in relation to the SSTC. Then, the PTS field for this frame should be set to $t_{disp}(I_0)$ less some offset which is decoder dependent and depends on the time taken for sequential-to-interlace conversion etc. i.e.:

$$PTS(I_0) = t_{disp}(I_0) - \text{offset} \quad \text{(Eqn 3)}$$

The DTS for this frame will be dependent on the number, $n_B$, of B-frames following this I frame in the bitstream before the next coded P-frame i.e.

$$DTS(I_0) = PTS(I_0) - (n_B + 1).T \quad \text{(Eqn 4)}$$

where T is the video frame period.

Assuming that the decoder is synchronised, the time at which data for this frame should start being sent to the decoder is then given by:

$$t_{trans}(I_0) = DTS(I_0) - vbv\_delay(I_0) \quad \text{(Eqn 5)}$$

i.e. the interface should start feeding out to the decoder the first frame of the image sequence when $$SSTC = t_{trans}(I_0) = t_{display}(I_0) - \text{offset} - (n_B + 1).T - vbv\_delay(I_0) \quad \text{(6)}$$

If we assume that the synthetic bitstream is fed to the decoder at an average rate of one coded frame per frame period, then the first frame of the synthetic bitstream should be fed to the decoder at a time given by:

$$SSTC = t_{trans}(I_0) - n_{synth}.T \quad \text{(Eqn 7)}$$

where $n_{synth}$ is the number of synthetic frames sent in the initialising synthetic bitstream.

Video data can be sent to the decoder either as a constant bit-rate (CBR) stream or as a variable bit-rate (VBR) stream. In VBR video streams the total bit-rate of the transport stream may be maintained at a constant rate by sending "null" transport stream packets as required.

Figure 3:
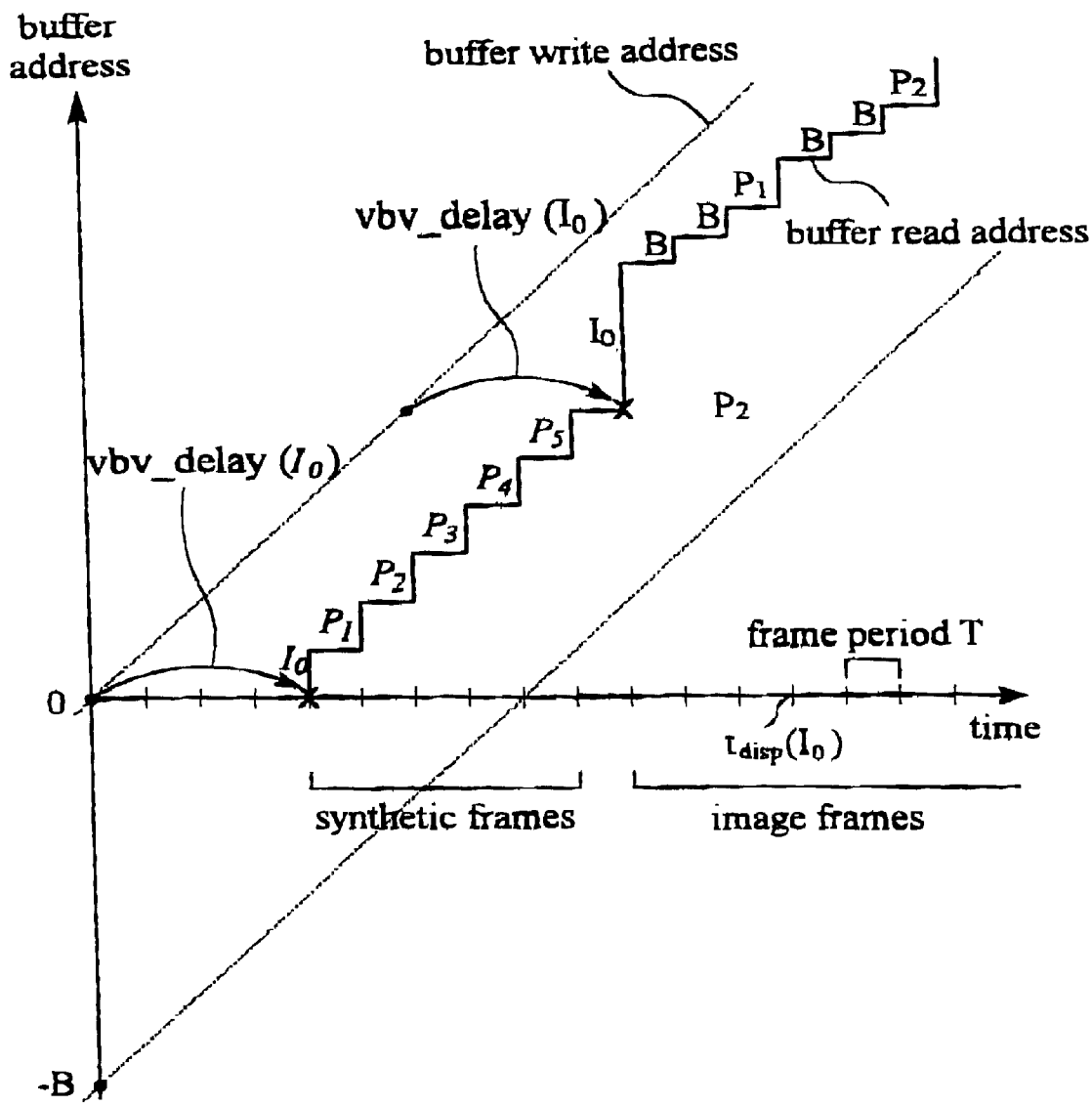
FIG. 3 shows decoder buffer addressing for decoder initialisation using synthetic bitstream in CBR (constant bit rate) mode.

Since the synthetic bitstream only requires a small bit-rate in comparison with real video sequence data, in order to maintain CBR operation, it is necessary to add a large number of stuffing bytes per frame to the coded synthetic frames. These will be written into the decoder buffer and discarded when the data is read from the buffer at a time corresponding to the DTS A diagram showing an example of the write and read addresses of the decoder buffer in CBR operation is shown in FIG. 3. As will be appreciated, a buffer is in practice accessed cyclically, with wraparound; when a read or write pointer reaches the end of the buffer (address B, where B is the buffer size), it returns to the beginning. For ease of understanding, the buffer addresses are shown as linearly increasing in FIG. 3 (and the subsequent figures), the real addresses will be equal to the indicated address modulo B (i.e. an address of N.B+x is equivalent to an address of x, where N is an integer and x<B)

In the example shown in FIG. 3, each coded synthetic frame is padded with stuffing bytes such that each frame takes one frame interval to be fed to the decoder at the CBR bit-rate.

The vbv-delay for the first synthetic frame is arranged to be equal to the vbv_delay of the first I frame of the image sequence. This allows CBR mode to be maintained.

As an example of VBR operation we can consider the case where the pre-coded image sequence has a fixed and constant bit-rate but the bit-rate of the synthetic video data fed to the video decoder is allowed to be less than this constant value. In order to avoid decoder buffer under/over-flow problems, a simple approach is to arrange that the synthetic data is fed to the decoder at a rate of one synthetic frame per frame period.

Figure 4:
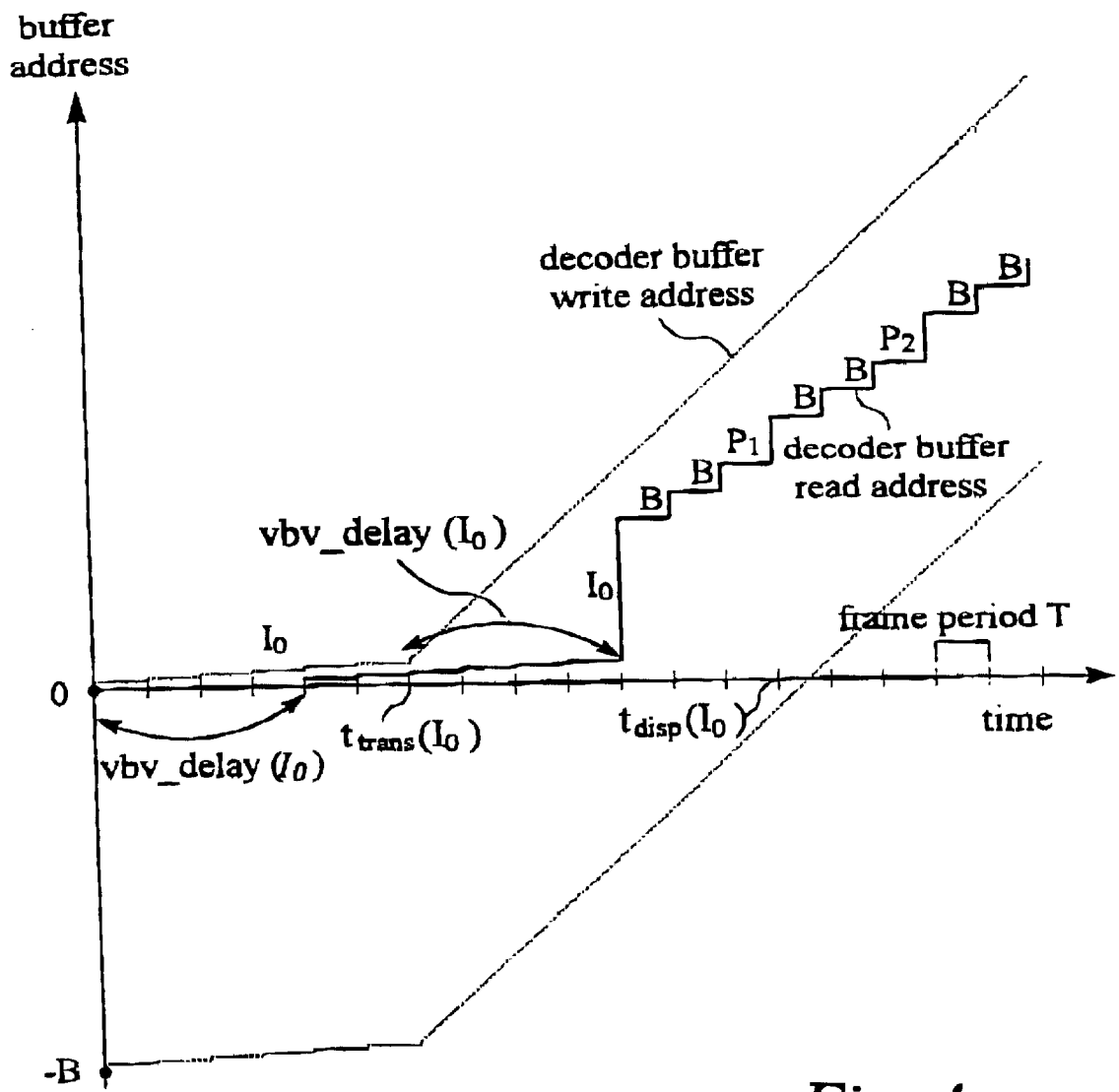
FIG. 4 shows decoder buffer addressing for decoder initialisation using synthetic bitstream in using a synthetic bitstream in VBR (variable bit rate) mode.

This is illustrated in FIG. 4. The data for the first synthetic frame is assigned an appropriate DTS value and fed to the decoder buffer at a time (given by Eqn 7) such that its vbv_delay value is equal to the vbv_delay of the first I frame of the sequence. Then the remaining synthetic frames are fed at a rate of one frame per frame period. At time, $t_{trans}(0)$, the first I frame of the sequence is sent and the vbv_delay value for this frame will be correct. FIG. 4 shows that the decoder buffer does not under-flow.

Note that, for all the frames (synthetic and image) there are no differences in the vbv_delay values for each frame between the CBR and VBR modes as shown in FIGS. 3 and FIG. 4.

Pausing a Decoder

Synthetic bitstreams can be used to pause a decoder at certain points in the sequence. A suitable synthetic sequence comprises a null series of P-frames. For example, suppose a series of synthetic P frames is inserted before a P-frame as shown below Original Sequence

| Bitstream | $I_0$ | B | B | $P_1$ | B | B | $P_2$ | B | B | $P_3$ | B | B | $P_4$ | B | B | $P_5$ | B | B | |
|---|---|---|---|---|---|---|---|---|---|---|---|---|---|---|---|---|---|---|---|
| Display | | B | B | $I_0$ | B | B | $P_1$ | B | B | $P_2$ | B | B | $P_3$ | B | B | $P_4$ | B | B | $P_5$ |

Sequence with Synthetic P Frames Inserted

| Bitstream | $I_0$ | B | B | $P_1$ | B | B | $P$ | $P$ | $P$ | $P$ | $P_2$ | B | B | $P_3$ | B | B | $P_4$ | B | B |
|---|---|---|---|---|---|---|---|---|---|---|---|---|---|---|---|---|---|---|---|
| Display | | B | B | $I_0$ | B | B | $P_1$ | $P$ | $P$ | $P$ | $P$ | B | B | $P_2$ | B | B | $P_5$ | B | B |

Whilst the decoder is decoding the synthetic P frames, it will continue to display the last decoded "anchor" frame which in this example is frame $P_1$. Since the B-frames are not stored in the decoder these cannot be repeated. Following the sequence of synthetic P-frames, the image sequence can be continued.

Simple "rules" which may be followed for inserting such a pausing bitstream are:

The DTS and "start-time-of-feeding-to-the-decoder" of the first synthetic P-frame are equal to those of the P-frame it is replacing (i.e. vbv_delays are equal).

For each synthetic P frame, $PTS_I=(DTS_I+T)$ and $DTS_{I+1}=(DTS_1+T)$

Figure 5:
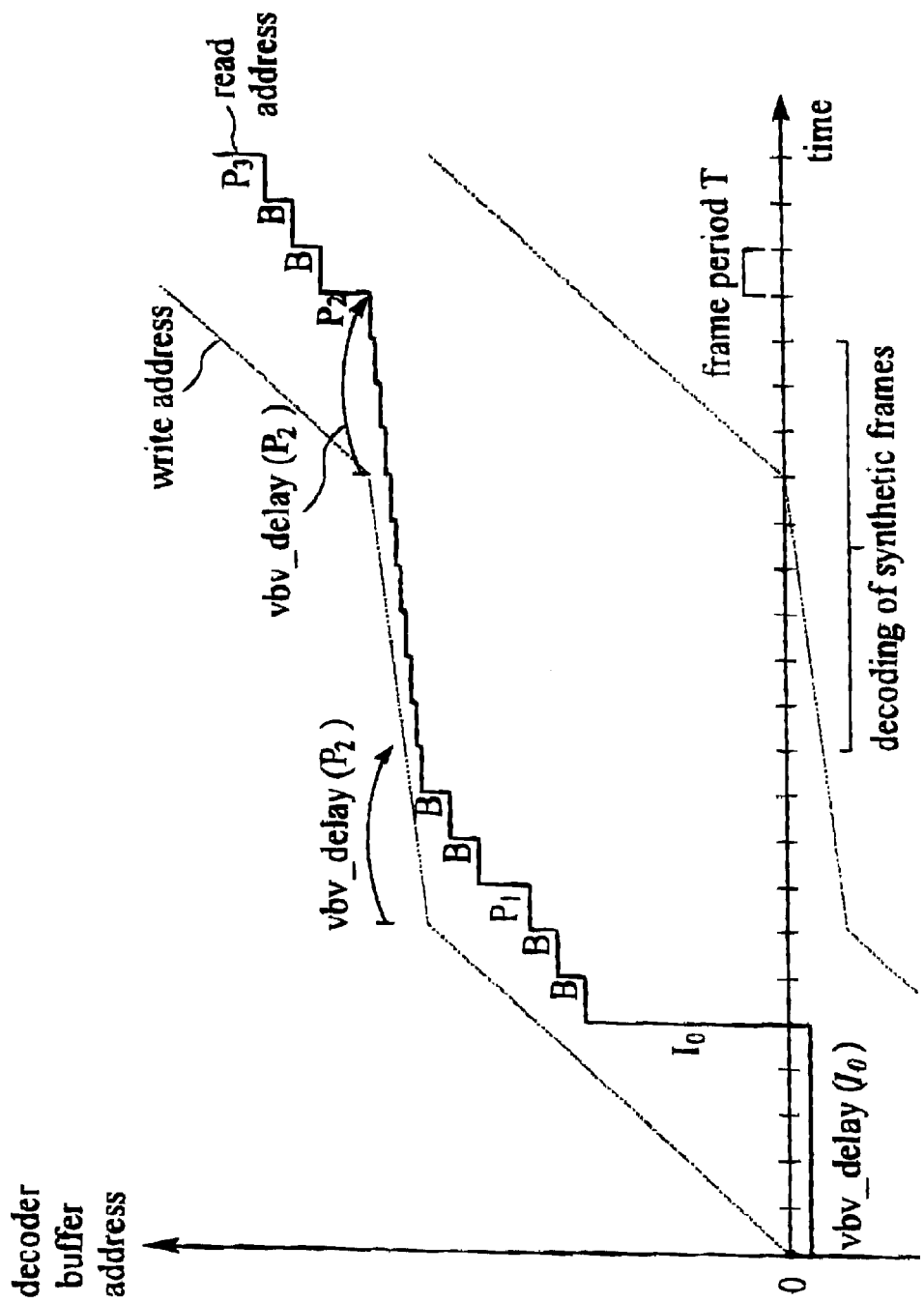
FIG. 5 shows decoder buffer addressing for decoder pausing using a synthetic bitstream in VBR mode.

The synthetic P-frames are fed to the decoder at a rate of one synthetic P-frame per frame period This ensures that the vbv_delay for the first coded image frame following the synthetic sequence is unaffected by the presence of the synthetic bitstream. This is illustrated in FIG. 5 for VBR-mode operation.

The PTS and DTS of coded image frames following the synthetic bitstream will need to be incremented by an amount equal to N frame periods, where N is the number of synthetic frames introduced into the bitstream A synthetic P-frame sequence can be used in a similar manner for pausing a decoder after an I-frame, thereby providing a means of displaying a still image.

Where it is required to pause a decoder for a prolonged period of time (for example several hours), particularly where it is not critical to maintain the last frame output, it may be desirable to insert I-frames into the sequence, for example black I frames, to ensure that synchronisation is not inadvertently lost.

Repeated (regular) insertion of synthetic frames may be used to effect slow-motion playback. It will be appreciated that to effect smooth slow motion playback, account needs to be taken of motion in the surrounding frames, rather than simply repeating the preceding frame, but nonetheless crude reduction in playback speed may be easily effected. When motion is taken into account, it will be appreciated that the size of the synthetic frames may no longer be negligible, but it should still be possible in most cases to generate synthetic P or B frames based on the content of the original sequence and transmit them within a single frame period avoiding buffer overflow/underflow problems.

Splicing Bitstreams

Synthetic sequences can also be used to help in the splicing together of different bitstreams using an approach very similar to that described for decoder initialisation and pausing; a splice using this approach can be considered similar to pausing of a decoder and establishing synchronisation to a new bitstream in a combined operation. However, the "rule" of sending one synthetic frame per frame period is not maintained for this application.

This can provide a simple, less functional but cheaper solution to splicing together MPEG-2 bitstreams thin conventional apparatus. A common requirement could be to switch (in real time) to a second sequence bitstream at some fairly arbitrary point in a first sequence bitstream without causing a downstream decoder any significant disturbance. The main problem here is matching the decoder buffer occupancy at the point of leaving the first sequence to the buffer occupancy required before the first coded frame of the second sequence. If these are not matched then the decoder buffer will over or under flow which will cause a significant disturbance to the decoded image sequence.

This matching of vbv_delay values can be achieved using synthetic bitstreams.

Consider the example below:

| Bitstream1 | $I_0$ | B | B | $P_1$ | B | B | $P_2$ | B | B | $P_3$ | B | B | $P_4$ | B | B | $P_5$ | B | B | |
|---|---|---|---|---|---|---|---|---|---|---|---|---|---|---|---|---|---|---|---|
| Bitstream2 | | | | | | | | | | $I_0$ | B | B | $P_1$ | B | B | $P_2$ | B | B | $P_3$ |
| Spliced stream | $I_0$ | B | B | $P_1$ | B | B | $P$ | $P$ | $P$ | $I_0$ | B | B | $P_1$ | B | B | $P_2$ | B | B | $P_3$ |
| Display | | B | B | $I_0$ | B | B | $P_1$ | $P_I$ | $P_I$ | $P_I$ | B | B | $I_0$ | B | B | $P_1$ | B | B | $P_2$ |

It is likely that, in order to avoid decoder buffer underflow for the first I frame of bitstream2, the vbv_delay value for $I_0$ of bitstream 2 will be greater than the vbv_delay value for frame $P_2$ of bitstream1. However, since the synthetic bitstreams contain an almost negligible number of bits, it is possible to transmit these in a short period of time and then advance the time at which the first byte of frame $I_0$ is fed to the decoder. In this way it is possible to achieve the correct vbv_delay value for $I_0$. This is illustrated in FIG. 6.

Figure 6:
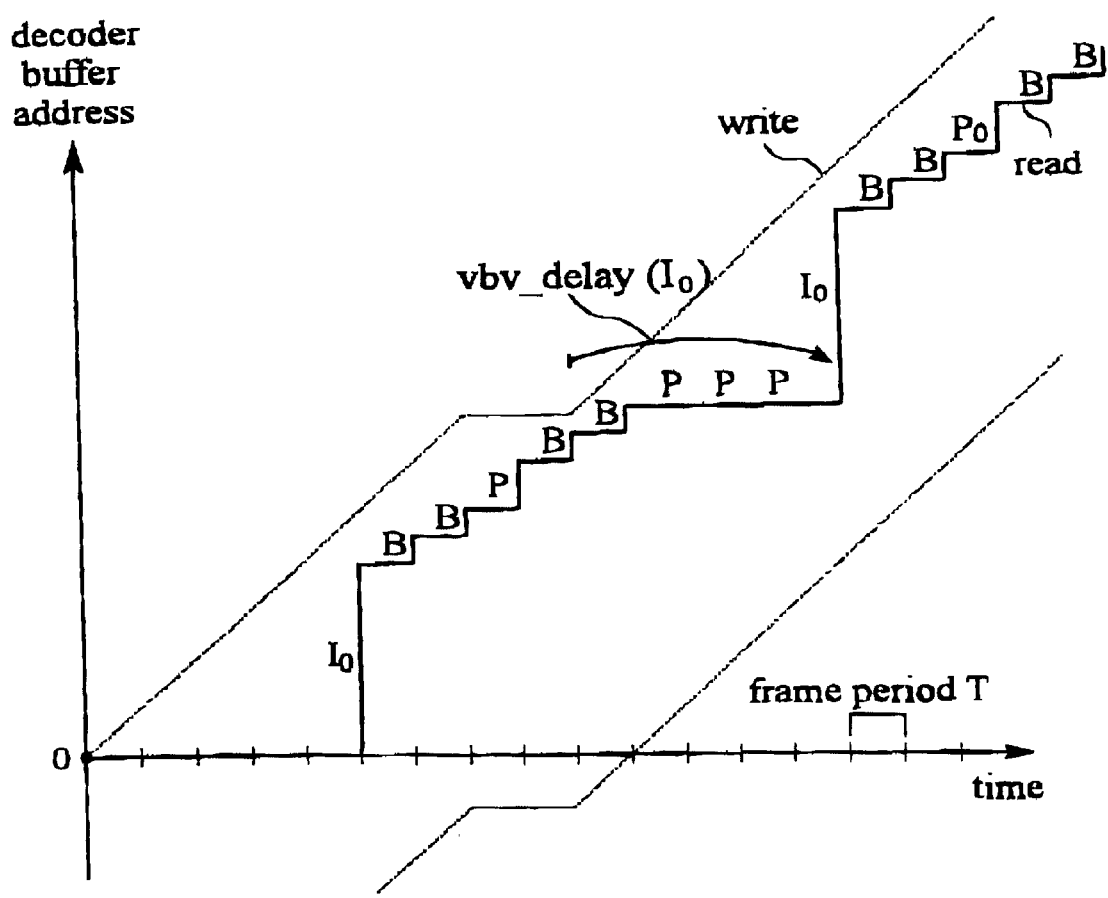
FIG. 6 shows decoder buffer addressing for bitstream splicing using a synthetic bitstream.

In FIG. 6, the three synthetic frames are fed to the decoder (taking negligible bits). Given that the decoding time of $I_0$ is probably pre-determined according to a display schedule, then the interface should start feeding out to the decoder the first frame of the image sequence at a time given by:

$$t_{trans}(I_0)=t_{disp}(I_0)-\text{offset}-(n_{B+}1).T-vbv\_\text{delay}(I_0) \text{ as in Eqn 6.}$$

The following considerations apply in this example:
the relative values of the PTS and DTS for each frame are maintained since the synthetic frames are introduced in place of a P-frame in sequence 1.
The PTS/DTS values of sequence 2 need to be have an offset value added to them in order to maintain continuity of these fields across the splice.
The DTS value and "start-time-of-feeding-to-the-decoder" of the first synthetic frame are equal to those of the P-frame it is replacing in sequence1.
For each synthetic P frame, PTSi=(DTSi+T) and DTSi+1=(DTSi+T)
The following points should also be noted:
The first synthetic frame could equally be a synthetic I frame, which would give black frames between the sequence.
The minimum number of synthetic frames required through the splice depends on the size of the vbv_ delay adjustment required.
The first frame of sequence2 must be an I frame.

In addition to the features mentioned above, the video output apparatus can provide other functions. For example, even without the means for generating synthetic frames, synchronisation to a studio reference clock can be effected, as discussed below.

Detecting and Auditing Video Output Rate

A stored MPEG video sequence contains a series of PCR fields, each field containing a clock value which increments at the clock rate (typically 27 Mhz) of the original capture apparatus when the sequence is played at the correct bit-rate. The correct bit rate will usually be specified with the stored data, and conventionally a video source simply plays the data out at the specified rate. For example a sequence may have been captured at 4 Mbit/s, and a conventional video source will simply output the data at that rate, based on its own clock source However when played back at 4 Mbit/s, it may be found that the PCR values increment at a rate slightly greater or less than 27 MHz, for example due to inaccuracies in the recording apparatus clock frequency. This can be detected by comparing the rate at which PCR values increase to a studio clock reference frequency, and can be corrected by adjusting the data output rate so that a counter updated at the same rate as the PCR values in the recorded video sequence maintains synchronism with the studio reference clock.

It will be appreciated that the invention has many applications, and can be extended to applications other than those described above. An example of another application of the invention is the "repair" or editing of corrupted video sequences by re-generating timing field values, or patching synthetic frames in to over-write corrupted data. It will also be appreciated that, whilst described in the context of video processing, the same techniques may be applied to other coded data supplied as a sequence of coded frames; in particular, synthetic coded audio frames and synchronisation of coded (e.g. MPEG) audio may be effected. Specifically, although MPEG format is most commonly employed to transmit data including video data, in an MPEG audio/visual/data sequence containing no video, the invention may be employed to establish synchronisation for the purposes of playing out of audio or data contained within the sequence. The format of the synthetic frames will, of course change; specifically, null frames will usually be employed as padding. However, in such cases, the term video as used throughout the description and claims may be replaced by audio or data as required. Each feature of the description or claims may be independently provided, unless otherwise stated. The appended abstract is incorporated herein by reference.

What is claimed is:

1. Apparatus for outputting a coded video sequence comprising:
   means for receiving a coded video sequence to be output; means for receiving a studio reference clock; means for outputting the coded video sequence in a form enabling real-time decoding of the coded video sequence to produce a sequence of pictures;
   means for processing the coded video sequence by altering one or more values in timing fields contained within the coded video sequence in dependence on timing information derived from the studio reference clock so that a decoder receiving the output coded video sequence produces decoded picture output from at a predetermined timing,
   means for determining a delay between commencement of output of data corresponding to a frame by said outputting means and display of the frame by a decoder, said means for processing being controlled in dependence on the determined delay, and including means for determining said delay time based on a predetermined offset value corresponding to a measure of propagation delay through said decoder and a variable value corresponding to the delay before decoding for said frame.

2. Apparatus for outputting a coded video sequence comprising:
   means for receiving a coded video sequence to be output; means for receiving a studio reference clock; means for outputting the coded video sequence in a form enabling real-time decoding of the coded video sequence to produce a sequence of pictures;
   means for processing the coded video sequence by altering one or more values in timing fields contained within the coded video sequence in dependence on timing information derived from the studio reference clock so that a decoder receiving the output coded video sequence produces decoded picture output from at a predetermined timing and having means for inputting information specifying a measure of desired picture output time of at least one frame or field of a video sequence or a DTS or PTS value, said processing and/or adjusting being selected based on the measure of desired picture output time and the studio reference clock so that said at least one frame or field is output from a decoder at the desired picture output time.

3. Apparatus for outputting a coded video sequence comprising:
   means for receiving a coded video sequence to be output; means for receiving a studio reference clock; means for outputting the coded video sequence in a form enabling real-time decoding of the coded video sequence to produce a sequence of pictures;
   means for processing the coded video sequence by altering one or more values in timing fields contained within the coded video sequence in dependence on timing information derived from the studio reference clock so that a decoder receiving the output coded video sequence produces decoded picture output from at a predetermined timing, arranged to receive a desired display time specified in a first format and the studio reference clock input in a second format and having means for converting between the first and second formats, wherein the first format includes hour, minute, second and frame display time information, and the second format includes a studio clock counter value, preferably having a clock frequency of at least 50 kHz and a size of at least 32 bits.

4. Apparatus for outputting a coded video sequence comprising:

means for receiving a coded video sequence to be output, means for receiving a studio reference clock; means for outputting the coded video sequence in a form enabling real-time decoding of the coded video sequence to produce a sequence of pictures;

means for processing, the coded video sequence by altering one or more values in timing fields contained within the coded video sequence in dependence on timing information derived from the studio reference clock so that a decoder receiving the output coded video sequence produces decoded picture output from at a predetermined timing, having means for determining an effective clock frequency for the output coded video sequence based on the rate of change of clock values contained within the output data and means for comparing or synchronising the effective clock frequency to the studio reference clock frequency.

5. Apparatus according to claim 4, wherein said clock values are PCR fields within an MPEG video sequence.

6. Apparatus for outputting a coded video sequence comprising:

means for receiving a coded video sequence to be output; means for receiving a studio reference clock; means for outputting the coded video sequence in a form enabling real-time decoding of the coded video sequence to produce a sequence of pictures;

means for processing the coded video sequence by altering one or more values in timing fields contained within the coded video sequence in dependence on timing information derived from the studio reference clock so that a decoder receiving the output coded video sequence produces decoded picture output from at a predetermined timing, including means for generating a sequence of one or more frames to be inserted in the output sequence and means for inserting the generated sequence into said coded video sequence to adjust the timing of picture output of frames of said coded video sequence the generated sequence being selected to maintain or establish synchronisation of a buffer of a decoder receiving the output sequence, for facilitating switching an output video sequence from a first coded video sequence to a second coded video sequence, wherein the size of the generated frames and/or the timing information associated with the generated frames and/or frames of said first and second coded video sequences is selected so that, on commencement of decoding of the second coded video sequence following said switching, the buffer occupancy of a decoder receiving said output video sequence will be substantially at a desired value.

7. Apparatus according to claim 6, wherein the desired value of buffer occupancy is determined based on an estimate of the buffer occupancy if the decoder had been receiving the second coded video sequence instead of the first coded video sequence and the generated sequence.

8. Apparatus according to claim 6 further including means for receiving editing list information specifying desired picture output time.

9. A multiple source video system comprising:

a plurality of video sequence sources, at least one video sequence source comprising outputting apparatus according to any preceding claim, each arranged to receive a respective coded video sequence and having a decoder coupled to the output thereof to produce a respective decoded video sequence output therefrom;

means for supplying a studio reference clock to the or each outputting apparatus;

means for receiving editing or playout information specifying timing of changes between video sequence sources;

means for supplying a selected video sequence source to a video output channel based on said editing or playout information; and means for supplying desired picture output time information to the or each outputting apparatus based on said editing information.

10. A method of outputting a coded video sequence comprising:

receiving a coded video sequence to be output;

receiving a studio reference clock;

processing the coded video sequence by altering one or more values in timing fields contained within the coded video sequence in dependence on timing information derived from the studio reference clock so that a decoder receiving the output coded video sequence produces decoded picture output from at a predetermined timing;

outputting the coded video sequence in a form enabling real-time decoding of the sequence to produce a sequence of pictures including inputting information specifying a measure of desired picture output time of at least one frame or field of a video sequence or a DTS or PTS value, said processing and/or adjusting being selected based on the measure of desired picture output time and the studio reference clock so that said at least one frame or field is output from a decoder at the desired picture output time.

11. A method according to claim 10 including receiving a desired display time specified in a first format, and the studio reference clock input in a second format, and converting between the first and second formats.

12. A method of outputting a coded video sequence comprising:

receiving a coded video sequence to be output;

receiving a studio reference clock;

processing the coded video sequence by altering one or more values in timing fields contained within the coded video sequence in dependence on timing information derived from the studio reference clock so that a decoder receiving the output coded video sequence produces decoded picture output from at a predetermined timing;

outputting the coded video sequence in a form enabling real-time decoding of the sequence to produce a sequence of pictures including receiving a desired display time specified in a first format, and the studio reference wherein the first format includes hour, minute, second and frame display time information, and the second format includes a studio clock counter value, preferably having a clock frequency of at least 50 kHz and a size of at least 32 bits.

13. A method of outputting a coded video sequence comprising:

receiving a coded video sequence to be output;

receiving a studio reference clock;

processing the coded video sequence by altering one or more values in timing fields contained within the coded video sequence in dependence on timing information derived from the studio reference clock so that a decoder receiving the output coded video sequence produces decoded picture output from at a predetermined timing;

outputting the coded video sequence in a form enabling real-time decoding of the sequence to produce a sequence of pictures including determining an effective clock frequency for the output coded video sequence based on the rate of change of clock values contained within the output data and comparing or synchronising the effective clock frequency to the studio reference clock frequency.

14. A method according to claim 13, wherein said clock values are PCR fields within an MPEG video sequence.

15. A method of outputting a coded video sequence comprising:

receiving a coded video sequence to be output;

receiving a studio reference clock;

processing the coded video sequence by altering one or more values in timing fields contained within the coded video sequence in dependence on timing information derived from the studio reference clock so that a decoder receiving the output coded video sequence produces decoded picture output from at a predetermined timing;

outputting the coded video sequence in a form enabling real-time decoding of the sequence to produce a sequence of pictures including generating a sequence of one or more frames to be inserted in the output sequence and inserting the generated sequence into said coded video sequence to adjust the timing of picture output of frames of said coded video sequence, the generated sequence being selected to maintain or establish synchronisation of a buffer of a decoder receiving the output sequence, for facilitating switching an output video sequence from a first coded video sequence to a second coded video sequence, wherein the size of the generated frames and/or the timing information associated with the generated frames and/or frames of said first and second coded video sequences is selected so that, on commencement of decoding of the second coded video sequence following said switching, the buffer occupancy of a decoder receiving said output video sequence will be substantially at a desired value.

16. A method according to claim 15, wherein the desired value of buffer occupancy is determined based on an estimate of the buffer occupancy if the decoder had been receiving the second coded video sequence instead of the first coded video sequence and the generated sequence.

17. A method of controlling a multiple source video system including at least one apparatus for outputting a coded video sequence comprising:

means for receiving a coded video sequence to be output;
means for receiving a studio reference clock; means for outputting the coded video sequence in a form enabling real-time decoding of the coded video sequence to produce a sequence of pictures;

means for processing the coded video sequence by altering one or more values in timing fields contained within the coded video sequence in dependence on timing information derived from the studio reference clock so that a decoder receiving the output coded video sequence produces decoded picture output from at a predetermined timing, and a decoder connected thereto, the method comprising:

supplying a studio reference clock to the or each outputting apparatus;

receiving editing or playout information specifying timing of changes between video sequence sources;

selecting a video sequence source for supply to a video output channel based on said editing information;

supplying desired picture output time information to the or each outputting apparatus based on said editing or playout information; and controlling the or each outputting apparatus based on said studio reference clock and said desired picture output time so that a desired picture output is available from said decoder at the time the decoder output is selected as said video sequence source.

18. Apparatus for processing frame display time information in real time comprising means for receiving data indicating a desired frame display time, the data including hour, minute, second and frame display time information, means for correlating the frame display time information to a studio clock counter value, preferably having a clock frequency of at least 50 kHz and a size of at least 32 bits, and means for producing output data encoding the frame display time information as a studio clock counter value.

* * * * *